(12) United States Patent
Zock

(10) Patent No.: US 11,788,590 B2
(45) Date of Patent: Oct. 17, 2023

(54) REAR BRAKE CONVERSION ASSEMBLY FOR ALL-TERRAIN VEHICLES

(71) Applicant: Richard Mellick Zock, Lapeer, MI (US)

(72) Inventor: Richard Mellick Zock, Lapeer, MI (US)

( * ) Notice: Subject to any disclaimer, the term of this patent is extended or adjusted under 35 U.S.C. 154(b) by 145 days.

(21) Appl. No.: 17/303,312

(22) Filed: May 26, 2021

(65) Prior Publication Data

US 2022/0381303 A1     Dec. 1, 2022

(51) Int. Cl.
*F16D 65/18* (2006.01)
*F16D 55/226* (2006.01)
*F16D 121/04* (2012.01)

(52) U.S. Cl.
CPC ........... *F16D 55/226* (2013.01); *F16D 65/18* (2013.01); *F16D 2121/04* (2013.01)

(58) Field of Classification Search
CPC ..... F16D 55/226; F16D 65/18; F16D 2121/04
USPC .......................................... 188/73.39–73.46
See application file for complete search history.

(56) References Cited

U.S. PATENT DOCUMENTS

| 4,086,986 A * | 5/1978 | Haraikawa ........ F16D 55/22655 188/73.45 |
| 4,673,064 A * | 6/1987 | Will ....................... B60T 1/065 206/335 |
| 5,819,886 A * | 10/1998 | Null ....................... B60T 7/203 188/72.5 |
| 11,046,296 B2 * | 6/2021 | Uehara ............... F16D 65/0075 |
| 2021/0262536 A1 * | 8/2021 | Banks ..................... F16D 65/09 |

FOREIGN PATENT DOCUMENTS

EP         3187402 A1 *  7/2017  ............. B62K 19/38

* cited by examiner

*Primary Examiner* — Christopher P Schwartz
(74) *Attorney, Agent, or Firm* — Dunlap Bennett & Ludwig, PLLC

(57) ABSTRACT

A rear brake conversion assembly for all-terrain vehicles is provided. The rear brake conversion assembly may include a leg-and-foot shaped assembly bracket for operatively associating a dual piston caliber braking component with the rear wheel plate by way of a wheel bracket. The leg-and-foot shaped assembly bracket provides a first attachment hole at the hip portion, a second attachment hole at the knee portion, a third attachment hole at the heel portion, and a fourth attachment hole at a toe portion, wherein the leg portion and the foot portion of the leg-and-foot shaped assembly bracket is at an obtuse angle relative to each other.

4 Claims, 3 Drawing Sheets

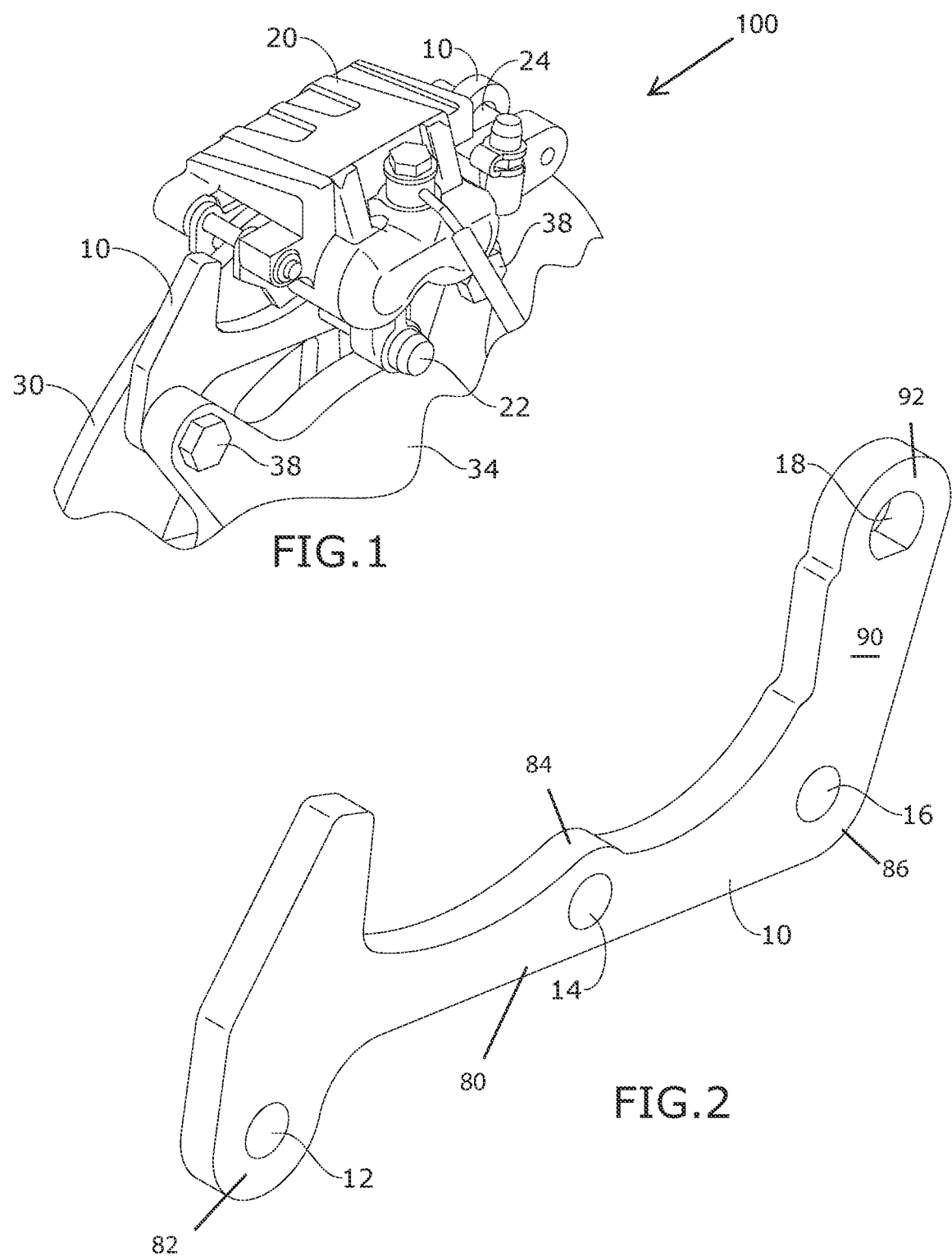

REAR BRAKE CONVERSION ASSEMBLY FOR ALL-TERRAIN VEHICLES

BACKGROUND OF THE INVENTION

The present invention relates to all-terrain vehicles and, more particularly, a rear brake conversion assembly for all-terrain vehicles and associated kit. All-terrain vehicles include quad bikes, motorbikes, dirt bikes, go karts, and other kinds of motorcycles and utility vehicles.

A disc brake is a type of brake that uses two caliper pistons to squeeze pairs of pads against a disc, wheel plate, or a "rotor" to create friction. Many current and popular older models of all-terrain vehicles have the less effective single piston caliper braking systems for their rear wheel(s). These original braking systems fail over time due to the wear and tear of its application and degradation.

Furthermore, all-terrain vehicle enthusiasts enjoy their rides at high speeds and in rugged environments, and so the need for abrupt stopping power is in demand, yet there currently is no bracket to adapt the braking system of the rear wheel of an all-terrain vehicle from a single piston caliper to dual piston calipers.

As can be seen, there is a need for a rear brake conversion assembly for all-terrain vehicles, enabling the conversion from an existing single-piston caliper braking system to an upgraded rear dual piston caliper system which provides better stopping power and less brake fade.

The rear brake conversion assembly embodied in the present invention may be configured in a kit specifically adapted for all-terrain vehicles that could benefit from an upgrade to a dual piston caliper braking system for the rear wheel(s).

SUMMARY OF THE INVENTION

In one aspect of the present invention, a rear brake conversion assembly for an all-terrain vehicle includes the following: an assembly bracket having: a first attachment hole; a second attachment hole; a third attachment hole; a fourth attachment hole; and the assembly bracket having a leg-and-foot shape, where the first attachment hole is at a hip portion thereof, the second attachment hole at a knee portion thereof, the third attachment hole at a heel portion thereof, and the fourth attachment hole at a toe portion thereof, wherein a leg portion and a foot portion of the leg-and-foot shape is at an obtuse angle relative to each other, and wherein the obtuse angle is less than one hundred and ten degrees, wherein the first attachment hole is approximately seventeen millimeters in a first direction relative to a longitudinal axis through a center of the second attachment hole, wherein the fourth attachment hole is approximately forty millimeters in a second direction relative to the longitudinal axis, and wherein the first and second directions are in opposite directions relative to the longitudinal axis.

In another aspect of the present invention, a rear brake conversion assembly kit includes the following: the above-mentioned assembly bracket; a dual piston caliber braking component having a center caliper shaft and an upper caliper shaft, wherein the second attachment hole and the fourth attachment hole is dimensioned to operatively connect to the center caliper shaft and the upper caliper shaft, respectively; and a wheel bracket having two spaced apart wheel bracket holes, wherein the first attachment hole and the third attachment hole are dimensioned to operatively connect to the two spaced apart wheel bracket holes, respectively.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention, shown in use;

FIG. 2 is a top perspective view of an exemplary embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a rear brake conversion assembly for all-terrain vehicles. The rear brake conversion assembly may include a leg-and-foot shaped assembly bracket for operatively associating a dual piston caliber braking component with the rear wheel plate by way of the wheel bracket. The leg-and-foot shaped assembly bracket provides a first attachment hole at the hip portion of the leg-and-foot shape, a second attachment hole at the knee portion, a third attachment hole at the heel portion, and a fourth attachment hole at a toe portion, wherein the leg portion and the foot portion of the leg-and-foot shaped assembly bracket is at an obtuse angle relative to each other.

Figure 5:
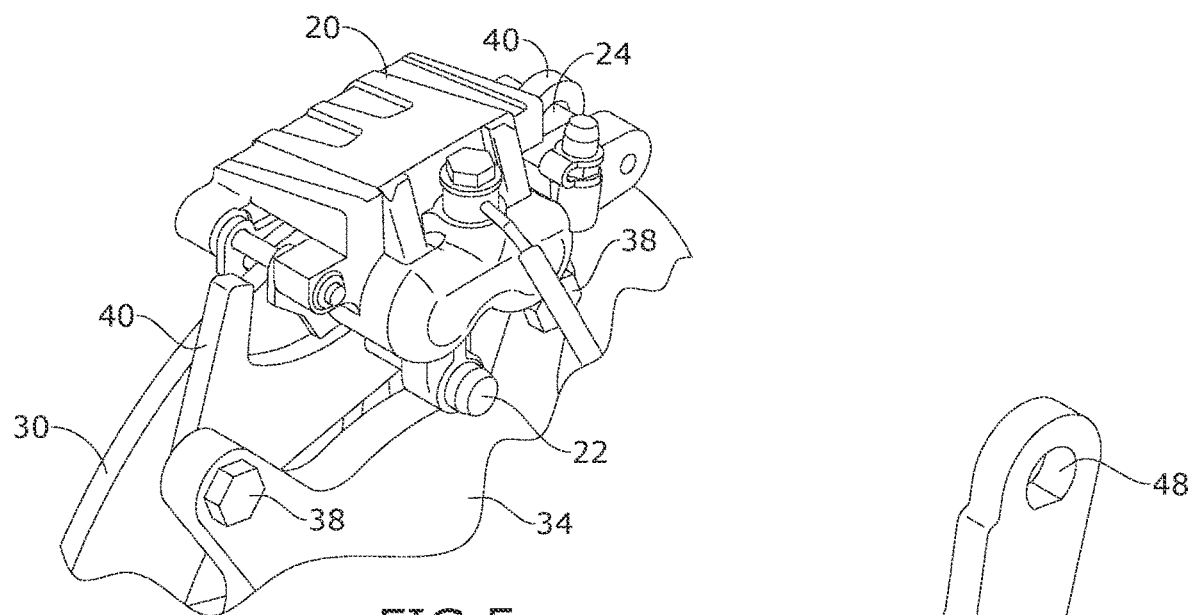
FIG. 5 is a perspective view of an exemplary embodiment of the present invention, shown in use.
Figure 6:
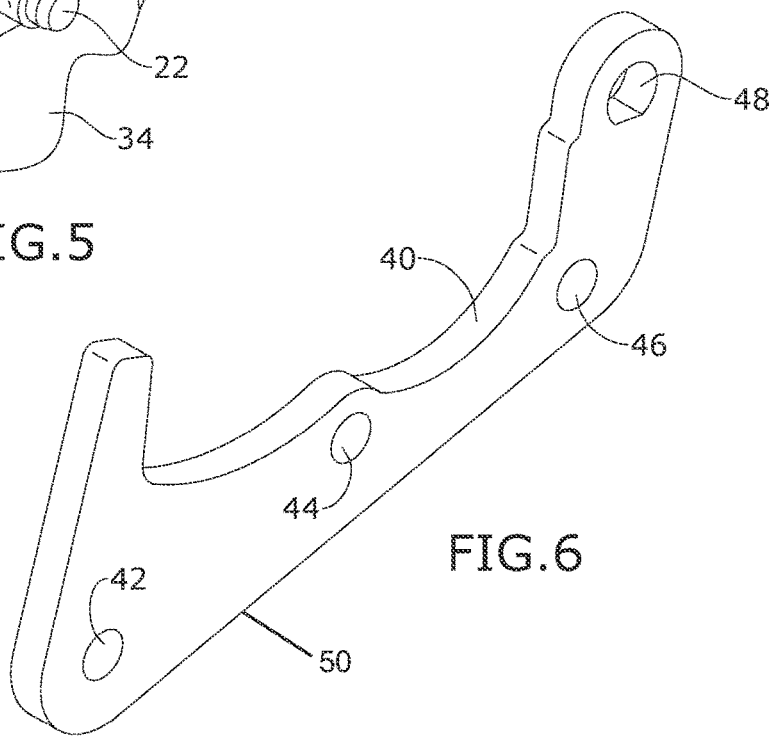
FIG. 6 is a perspective view of an exemplary embodiment of the present invention.

It should be understood by those skilled in the art that the use of directional terms such as upper and the like are used in relation to the illustrative embodiments as they are depicted in the figures, the upper direction being toward the top margins of FIG. 5.

Referring now to FIGS. 1 through 7, the present invention may include a rear brake conversion assembly 100 for all-terrain vehicles and associated kit comprising an assembly bracket 10, 40 and a dual piston caliber braking component 20. The dual piston caliber braking component 20 is dimensioned and adapted to operatively associate with the wheel plate 30 of the rear wheel. The dual piston caliper braking component 20 includes a center caliper shaft 22 and an upper caliper shaft 24 to engaging the assembly bracket 10, which in turn is supported by a wheel bracket 34. The wheel bracket 34 has two spaced apart wheel bracket holes 36.

The assembly bracket 10, 40 has a first attachment hole 12, 42 a second attachment hole 14, 44 a third attachment hole 16, 46 and a fourth attachment hole, 18, 48. The first attachment hole 12, 42 and the third attachment hole 16, 46 are dimensioned and adapted to be connected to the two spaced apart wheel bracket holes 36 by a fastener 38, such as a bolt for each connected holes. The second attachment hole 14, 44 and the fourth attachment hole 18, 48 are dimensioned and adapted to be operatively associate with the center caliper shaft 22 and the upper caliper shaft 24, respectively.

In certain embodiments, the assembly bracket 10, 40 has L-shape or leg-and foot shape, wherein the longitudinal edge 50 is associated with the longer portion of the L-shape or the leg of the leg-and-foot shape. The longer portion or leg portion 80 is at least twice the length of the short portion or foot portion 90 of the L-shape, wherein the short portion would be the foot shape of the leg-and-foot shape. The L-shape may not be a true right angle, but rather the longer and short portions define an obtuse angle that is less than one hundred and then degrees. Following the leg-and-foot shape, the first attachment hole 12, 42 may be disposed adjacent a hip portion 82 of the leg portion 80, the second attachment hole 14, 44 at the knee portion 84, the third attachment hole 16, 46 at the ankle portion 86, and the fourth attachment hole, 18, 48 at the toe portion 92 of the foot portion 90.

Accordingly, the fourth attachment hole 18, 48 may be at a greater, fourth elevation (a "fourth distance") relative the longitudinal edge 50 in comparison to the other attachment holes 12, 14, 16, 42, 44, 46. The first, second, and third attachment holes 12, 42, 14, 44, and 16, 46 may be generally parallel. In certain embodiments, the second attachment hole 14, 44 is at a second elevation relative to the longitudinal edge 50, wherein the second elevation is at a greater elevation than the first and third attachment holes 12, 42 and 16, 46.

Figure 3:
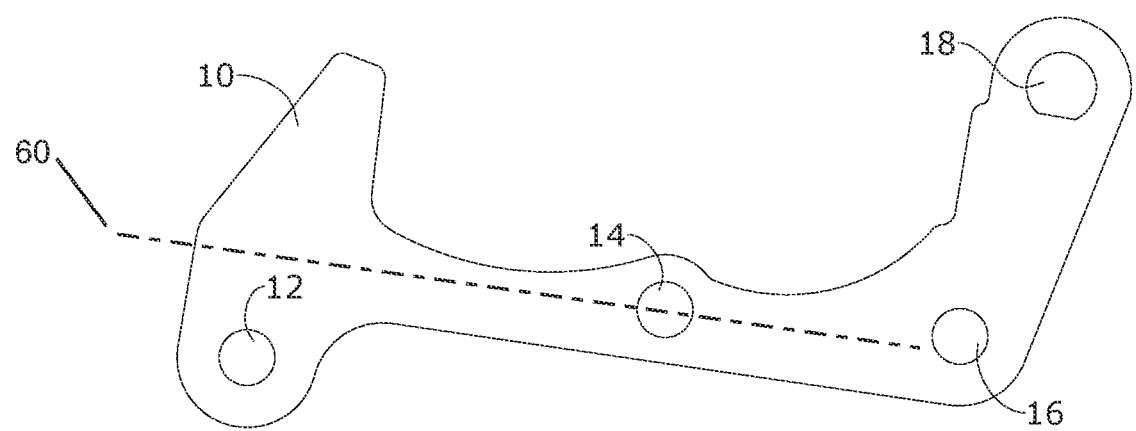
FIG. 3 is a front perspective view of an exemplary embodiment of the present invention.
Figure 4:
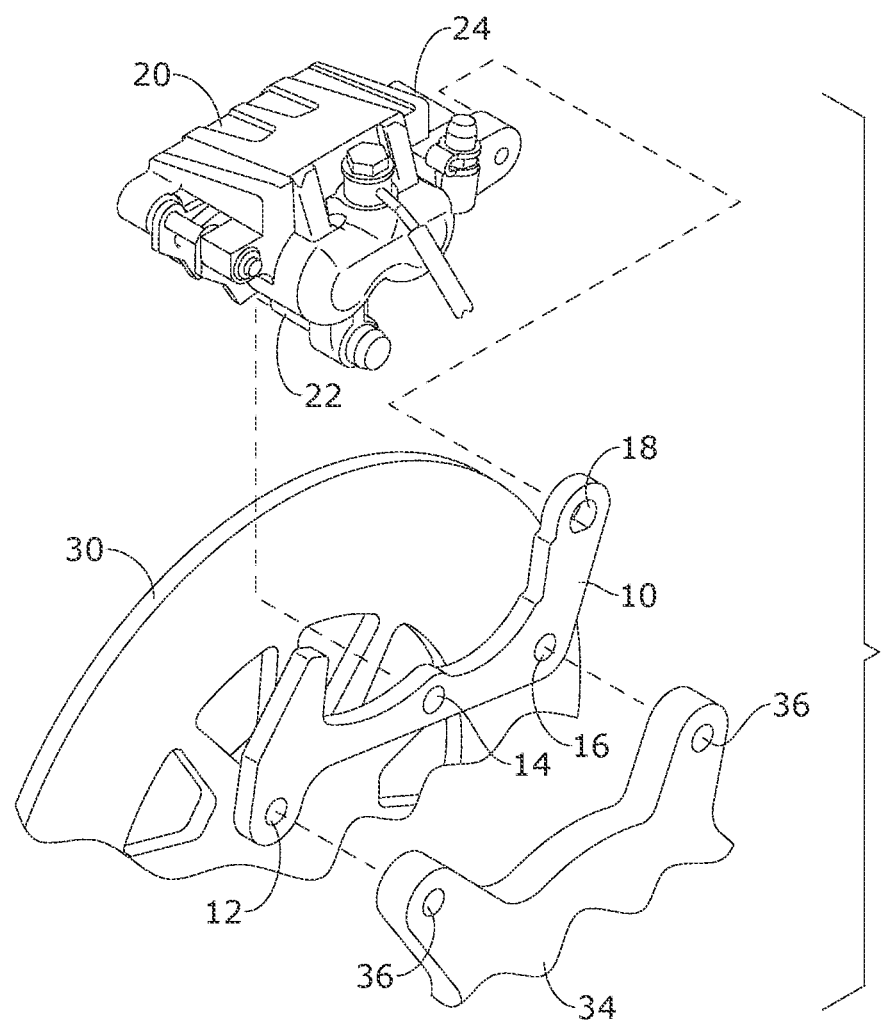
FIG. 4 is an exploded perspective view of an exemplary embodiment of the present invention, with attachment hardware not shown for clarity.

In one embodiment, a longitudinal axis 60 may extend through the center of the second attachment hole 14, as illustrated in FIG. 3. A first (orthogonal) distance between a center of the first attachment hole 12 and the longitudinal axis 60 may be approximately 16.5 millimeters (mm), while a third distance between the third attachment hole 16 and the longitudinal axis 60 may be approximately three mm (in the opposing direction as the first direction). The fourth attachment hole 18 may be approximately forty to fifty mm orthogonally offset from the longitudinal axis 60. Along the longitudinal axis 60, the first attachment hole 12 may be approximately fifty-eight mm from the second attachment hole 14 and the second attachment hole 14 is approximately forty-two mm from the third attachment hole 16, while the fourth attachment hole 18 is approximately five to ten mm from the third attachment hole 16. These dimensions are center to center.

Figure 7:
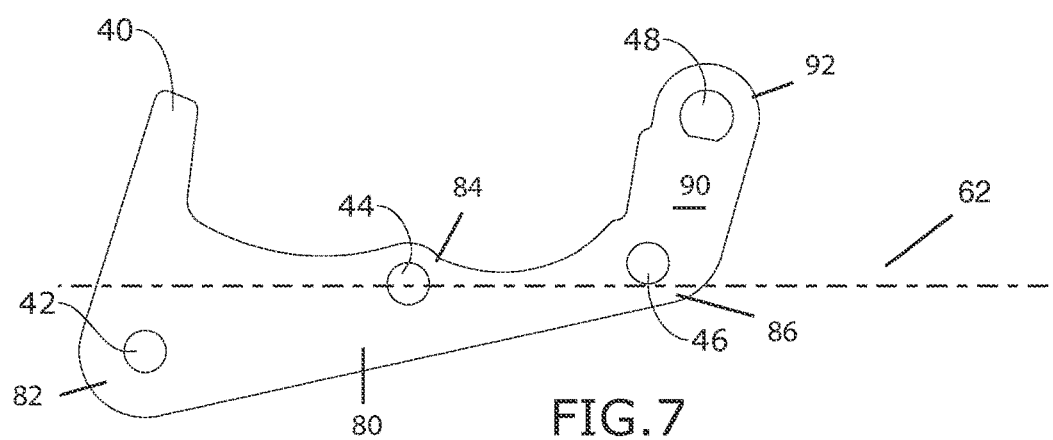
FIG. 7 is a front elevation view of an exemplary embodiment of the present invention.

In another embodiment, illustrated in FIG. 7, may have the first attachment hole 42 and the second attachment hole 44 spaced apart approximately forty-two mm in parallel with a second axis 62 and approximately thirty-one mm orthogonal relative to the second axis 62. The third attachment hole 46 and the second attachment hole 44 may be spaced apart approximately forty-one mm in parallel with the second axis 62 and approximately twenty-one mm orthogonal relative to the second axis 62. The third attachment hole 46 and the fourth attachment hole 48 may be spaced apart approximately five mm in parallel with the second axis 62 and approximately thirty mm orthogonal relative to the second axis 62. These dimensions are center to center. The thickness of the assembly bracket 10 is approximately 6 mm.

As used in this application, the term "about" or "approximately" refers to a range of values within plus or minus 10% of the specified number.

The kit may include the assembly bracket 10, the dual piston caliper braking component 20, and in certain embodiments, the wheel bracket 34, wherein the assembly bracket 10 is needed for the correct installation of the dual piston caliper braking component 20 to fit the machine it is intended for, while providing the correct amount of spacing on the brake rotor, wheel plate 30.

A method of using the present invention may include the following. The rear brake conversion assembly 100 or kit disclosed above may be provided. A user may remove the existing brake caliper only, installing the assembly bracket 10 to the existing mounting on the machine. Install the dual piston caliper braking component 20 to the assembly bracket 10 with the existing hardware, and then bleed the brake system.

It should be understood, of course, that the foregoing relates to exemplary embodiments of the invention and that modifications may be made without departing from the spirit and scope of the invention as set forth in the following claims.

What is claimed is:

1. A rear brake conversion assembly for an all-terrain vehicle, the assembly comprising:
   an assembly bracket comprising:
      a first attachment hole;
      a second attachment hole;
      a third attachment hole;
      a fourth attachment hole; and
   the assembly bracket having a leg-and-foot shape, where the first attachment hole is at a hip portion thereof, the second attachment hole at a knee portion thereof, the third attachment hole at a heel portion thereof, and the fourth attachment hole at a toe portion thereof,
   wherein the first attachment hole is approximately seventeen millimeters in a first direction relative to a longitudinal axis through a center of the second attachment hole, wherein the fourth attachment hole is approximately forty millimeters in a second direction relative to the longitudinal axis, and wherein the first and second directions are in opposite directions relative to the longitudinal axis.

2. The assembly of claim 1, wherein a leg portion and a foot portion of the leg-and-foot shape is at an obtuse angle relative to each other, and wherein the obtuse angle is less than one hundred and ten degrees.

3. A rear brake conversion assembly kit, comprising:
   the assembly bracket of claim 2; and
   a dual piston caliper braking component having a center caliper shaft and an upper caliper shaft,
   wherein the second attachment hole and the fourth attachment hole is dimensioned to operatively connect to the center caliper shaft and the upper caliper shaft, respectively.

4. The rear brake conversion assembly kit of claim 3, comprising:
   a wheel bracket having two spaced apart wheel bracket holes, wherein the first attachment hole and the third attachment hole are dimensioned to operatively connect to the two spaced apart wheel bracket holes, respectively.

* * * * *